United States Patent [19]
Shamasundara

[11] Patent Number: 5,119,508
[45] Date of Patent: Jun. 2, 1992

[54] PREDICTIVE AGC IN TDM SYSTEMS

[75] Inventor: H. N. Shamasundara, Arlington Heights, Ill.

[73] Assignee: Motorola, Inc., Schaumburg, Ill.

[21] Appl. No.: 645,337

[22] Filed: Jan. 18, 1990

Related U.S. Application Data

[63] Continuation of Ser. No. 274,229, Nov. 18, 1988, abandoned.

[51] Int. Cl.⁵ .............................................. H04B 1/16
[52] U.S. Cl. ................................. 455/234.1; 455/254
[58] Field of Search ............... 455/200, 234, 239, 240, 455/246, 249, 254, 33, 51, 266

[56] References Cited

U.S. PATENT DOCUMENTS

| | | | |
|---|---|---|---|
| 4,619,002 | 10/1986 | Thro | 455/254 |
| 4,691,377 | 9/1987 | Yoshihara et al. | 455/240 |
| 4,696,052 | 9/1987 | Breeden | 455/51 |
| 4,827,511 | 5/1989 | Masuto | 455/240 |

FOREIGN PATENT DOCUMENTS 0000231  1/1984  Japan ................................... 455/254

OTHER PUBLICATIONS

Section 4.2, Dynamic Range Problems—STC and IAGC, from "Radar Design Principles", by F. E. Nathanson.
Section 14—14 at p. 376 from "Microwave Receivers", Rad. Lab. 1948.

*Primary Examiner*—Curtis Kuntz
*Attorney, Agent, or Firm*—F. John Motsinger; Anthony J. Sarli

[57] ABSTRACT

In a communication system having a time base for system synchronization, there is provided a method and apparatus for controlling the sensitivity of a receiver comprising the steps of (a) receiving a signal that was predeterminally transmitted by another relative to the time base (wherein signal reception is confirmed when the amplitude of the received signal exceeds a pre-established threshold), (b) determining signal transit time from the time difference between the instant of signal reception relative to the time base and the instant of signal transmission relative to the time base, (c) controlling the sensitivity of the receiver as a function of the transit time by: (1) increasing the gain of the receiver from a minimum sensitivity at the predetermined transmission instant to a maximum sensitivity at maximum range (maximum expected transit time) and (2) nominally maintaining the receiver's gain at the level prevailing at the instant the signal is received.

16 Claims, 1 Drawing Sheet

PREDICTIVE AGC IN TDM SYSTEMS

This is a continuation of application Ser. No. 07/274,229, filed Nov. 18, 1988 and now abandoned.

FIELD OF INVENTION

This invention is concerned with controlling the sensitivity of radio receivers. More particularly, this invention relates to ways of adjusting the gain of a cellular base receiver as a function of mobile transmitter range.

BACKGROUND OF THE INVENTION

Ordinarily, the requisite gain for a communications session between a cellular base site receiver having limited dynamic range and a given cellular mobile radio transmitter is derived from earlier signal strength measurements taken from previous transmissions from the same mobile transmitter. However, where a history of prior transmissions, does not exist, particularly with the reception of bursty transmissions, establishing the requisite gain for receivers with limited dynamic range represents a formidable challenge.

In wideband Time Division multiplexed Multiple Access (TDMA) systems, an RF channel is time-shared by multiple users who must by synchronized to the system. When bursty transmissions are used for initial access to the system, particularly when they are foreshortened burst transmissions to allow some access tolerance for those accessing the system for the first time, there is no history of prior transmissions from which to derive the requisite gain information. Traditional approaches to this type of problem include fast Automatic Gain Control (AGC) loops (which commonly experience stability difficulties) and long preamble training sequences to allow the AGC loop to stabilize. But in many bursty transmission systems, like the TDMA cellular system presently proposed in Europe, long training sequences are simply not feasible or available.

Nevertheless, it is herein proposed to estimate the expected nominal path loss of the signal and predict the requisite gain from TDMA synchronization information. From the system's synchronization information, the propagation delay (the time between signal transmission by the mobile transmitter and reception by the base site receiver) can be determined. Propagation delay is linearly proportional to distance which, in turn, is the primary determiner of path loss. This path loss is somewhat variable with terrain and can be made part of and calibrated into the gain prediction. Thus, the requisite gain to compensate for the total path loss can be estimated as a function of propagation delay and local propagation conditions. Hence, the dynamic range of the receiver need only be able to cover the residual error of the estimate rather than the entire possible signal attenuation.

This invention has, then, as its object to provide predictive AGC in TDM systems and overcome these challenges. It has the advantages of being able to utilize receivers with normal dynamic range, maintain brief preamble sequences, assure AGC stability and accommodate local propagation conditions in its path loss prediction.

SUMMARY OF THE INVENTION

In a communications system having a time base for system synchronization, there is provided a method and apparatus for controlling the sensitivity of a receiver comprising the steps of (a) receiving a signal that was predeterminally transmitted by another relative to the time base (wherein signal reception is confirmed when the amplitude of the received signal exceeds a pre-established threshold), (b) determining signal transit time from the time difference between the instant of signal reception relative to the time base and the instant of signal transmission relative to the time base, and (c) controlling the sensitivity of the receiver as a function of the transit time by: (1) increasing the gain of the receiver from a minimum sensitivity at the predetermined transmission instant to a maximum sensitivity at maximum range (maximum expected transit time) and (2) nominally maintaining the receiver's gain at the level prevailing at the instant the signal is received.

DESCRIPTION OF THE DRAWINGS

Additional objects, features and advantages of the present invention will be more clearly understood and the best mode contemplated for practicing it in its preferred embodiment appreciated (by way of unrestricted example) from the following detailed description taken together with the accompanying drawings in which.

DETAILED DESCRIPTION

Figure 2:
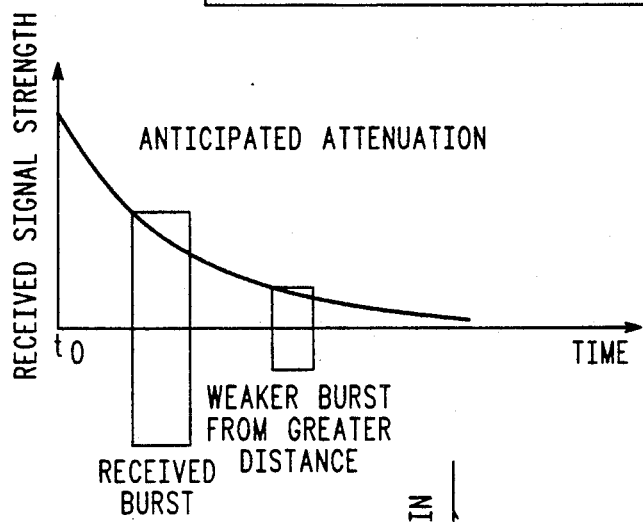
FIG. 2 is a graph of received signal strength attenuation versus time (and distance).
Figure 3:
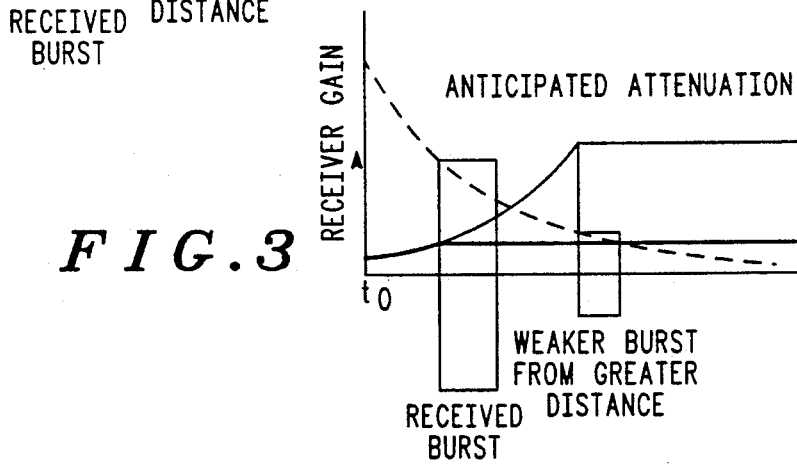
FIG. 3 is a graph of receiver gain versus time (and distance).
Figure 4:
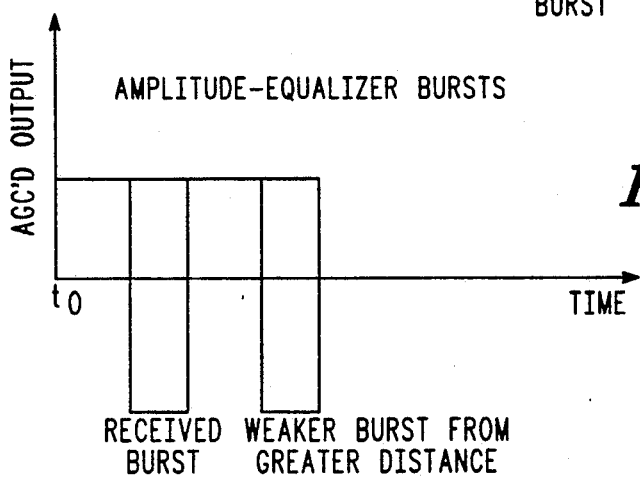
FIG. 4 is a graph of amplitude-equalized transmission bursts versus time (and distance).

As illustrated in FIG. 2, the received signal strength of a transmitted burst predictably attenuates with time (and distance), although somewhat dependent upon local propagation conditions, such as terrain. As illustrated in FIG. 3, if, in time synchronism with the transmission instant (t0), the receiver's gain is increased as the nominal reciprocal of the attenuation function until the burst transmission is received and then the gain is held at that level, all burst transmissions will be amplitude-equalized, as illustrated in FIG. 4.

Figure 1:
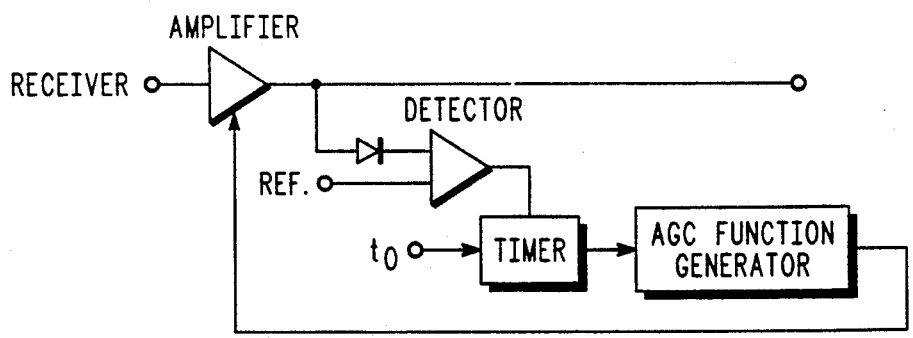
FIG. 1 is a functional block diagram of the present invention which incorporates the preferred embodiment of the present invention and incorporates the best mode contemplated for carrying out the invention.

FIG. 1 is a functional block diagram of the invention. FIG. 1 illustrates a timer (T) that, when started (t0) by the receiver's TDMA controller (not shown), provides the timing for an AGC function generator (FG). The AGC function generator (FG) is coupled to the control input of an AGC amplifier (AMP) that controls the gain of the received signal (RX). The gain-controlled output of the AGC amplifier (AMP) is coupled to a differential amplifier, threshold detector (Det.) that stops the timer (T) when the gain-controlled signal exceeds a threshold (Ref.).

In operation, the receiver's TDMA controller starts a timer (T) in synchronism with the pre-established time base of the TDM time slots for burst transmissions. From the pre-established transmission instant (t0), the AGC function generator (FG) generates an increasing gain function that is the nominal reciprocal of the signal attenuation function. The received signal (RX) is increasingly gain amplified by an AGC amplifier (AMP) until its amplitude exceeds a given threshold (Ref.) in the threshold detector (Det.) and stops the timer (T).

The AGC function generator output is then held at that prevailing gain level.

The AGC function generator (FG) may comprise a continuous voltage ramp generator followed by a sample and hold circuit under the control of the threshold detector (Det.) or as a lookup table generator with elapsed time input (T), both of which are well known by those ordinarily skilled in this field. The AGC function generator (FG) operates to increase the gain of the receiver from a minimum sensitivity at the predetermined transmission instant to a maximum sensitivity at maximum range (maximum expected transit time) and then nominally maintains the receiver's gain at the level prevailing at the instant the signal is received.

Either AGC function generator may be calibrated for local propagation conditions, such as terrain, to track the variance in propagation delay and the conditions affecting it.

This invention advantageously enables the use of receivers with normal dynamic range, maintains the use of the briefest preamble sequences, assures AGC stability and accommodates local propagation conditions in its path loss prediction.

Thus, in a communications system having a time base for system synchronization, there has been provided a method and apparatus for controlling the sensitivity of a receiver comprising the steps of (a) receiving a signal that was predeterminally transmitted by another relative to the time base (wherein signal reception is confirmed when the amplitude of the received signal exceeds a pre-established threshold), (b) determining signal transit time from the time difference between the instant of signal reception relative to the time base and the instant of signal transmission relative to the time base, (c) controlling the sensitivity of the receiver as a function of the transit time by: (1) increasing the gain of the receiver from a minimum sensitivity at the predetermined transmission instant to a maximum sensitivity at maximum range (maximum expected transit time) and (2) nominally maintaining the receiver's gain at the level prevailing at the instant the signal is received.

The foregoing description of the various embodiments are illustrative of the broad inventive concept comprehended by the invention and has been given for clarity of understanding by way of unrestricted example. However, it is not intended to cover all changes and modifications which do not constitute departures from the spirit and scope of the invention.

What I claim and desire to secure by Letters Patent is:

1. In a communications system having a time base for system synchronization, a method of controlling receiver sensitivity comprising:
   receiving a signal that was predeterminally transmitted by a transmitter relative to the time base,
   determining the difference in time between the instant of signal transmission by the transmitter and the instant of signal reception by the receiver, and
   controlling the receiver sensitivity as a function that time difference.

2. A method as claimed in claim 1, wherein the sensitivity controlling comprises adjusting receiver gain as a function of that time difference.

3. A method as claimed in claim 1, wherein the sensitivity controlling comprises increasing the gain of the receiver with increasing time difference.

4. A method as claimed in claim 1, further comprising adjusting the gain for local propagation conditions.

5. A method as claimed in claim 4, comprising adjusting the gain for local terrain conditions.

6. A method as claimed in claim 1, wherein the signal reception is confirmed when the amplitude of the received signal exceeds a pre-established threshold.

7. In a communications system having a time base for system synchronization, a method of controlling receiver sensitivity comprising:
   receiving a signal that was predeterminally transmitted by another relative to the time base wherein signal reception is confirmed when the amplitude of the received signal exceeds a pre-established threshold,
   determining the time difference between the instant of signal reception relative to the time base and the instant of signal transmission relative to the time base,
   controlling receiver sensitivity as a function of that time difference by:
   increasing the gain of the receiver from a minimum sensitivity at the predetermined transmission instant to a maximum sensitivity at the maximum expected time difference and
   nominally maintaining the receiver's gain at the level prevailing at the instant the signal is received.

8. In a communications system having a time base for system synchronization, a receiver comprising:
   means for receiving a signal that was predeterminally transmitted by another relative to the time base,
   means, coupled to the receiving means, for determining the time difference between the instant of signal reception relative to the time base and the instant of signal transmission relative to the time base, and
   means, coupled to the determining means, for controlling the sensitivity of the receiver as a function of that time difference.

9. A receiver as claimed in claim 9, wherein the sensitivity controlling means comprises means for adjusting the gain of the receiver as a function of that time difference.

10. A receiver as claimed in claim 8, further comprising means, coupled to the sensitivity control means, for adjusting the gain for local propagation conditions.

11. A receiver as claimed in claim 10, wherein the calibrating means further comprises means, coupled to the sensitivity control means, for adjusting the gain for local terrain conditions.

12. A receiver as claimed in claim 8, wherein signal reception is confirmed when the amplitude of the received signal exceeds a pre-established threshold.

13. In a communications system having a time base for system synchronization, a receiver comprising:
   means for receiving a signal that was predeterminally transmitted by another relative to the time base wherein signal reception is confirmed when the amplitude of the received signal exceeds a pre-established threshold,
   means, coupled to the receiving means, for determining signal transit time from the time difference between the instant of signal reception relative to the time base and the instant of signal transmission relative to the time base,
   means, coupled to the determining means, for controlling the sensitivity of the receiver as a function of the transit time comprising:
   means for increasing the gain of the receiver from a minimum sensitivity at the predetermined transmission instant to a maximum sensitivity at the maximum expected transit time and means, coupled to the gain adjusting means, for nominally maintaining the receiver's gain at the level prevailing at the instant the signal is received.

14. In a communications system having a time base for system synchronization, a method of controlling receiver sensitivity comprising:

receiving a signal that was predeterminally transmitted by a transmitter relative to the time base, determining the difference in time between the instant of signal transmission by the transmitter and the instant of signal reception by the receiver, and controlling the receiver sensitivity as a function of that time difference by:

increasing the gain of the receiver from a minimum sensitivity at the predetermined transmission instant to a maximum sensitivity at the maximum expected time difference and nominally maintaining the receiver's gain at the level prevailing at the instant the signal is received.

15. In a communications system having a time base for system synchronization, a receiver comprising:

means for receiving a signal that was predeterminally transmitted by another relative to the time base, means, coupled to the receiving means, for determining the time difference between the instant of signal reception relative to the time base and the instant of signal transmission relative to the time base, and means, coupled to the determining means, for controlling the sensitivity of the receiver as a function of that time difference by increasing the gain of the receiver with increasing time difference.

16. In a communications system having a time base for system synchronization, a receiver comprising:

means for receiving a signal that was predeterminally transmitted by another relative to the time base, means, coupled to the receiving means, for determining the time difference between the instant of signal reception relative to the time base and the instant of signal transmission relative to the time base, and means, coupled to the determining means, for controlling the sensitivity of the receiver as a function of that time difference by:

means for increasing the gain of the receiver from a minimum sensitivity at the predetermined transmission instant to a maximum sensitivity at the maximum expected time difference and means, coupled to the gain adjusting means, for nominally maintaining the receiver's gain at the level prevailing at the instant the signal is received.

* * * * *

UNITED STATES PATENT AND TRADEMARK OFFICE
CERTIFICATE OF CORRECTION

PATENT NO. : 5,119,508

DATED : June 2, 1992

INVENTOR(S) : H. N. Shamasundara

It is certified that error appears in the above-identified patent and that said Letters Patent is hereby corrected as shown below:

In claim 1, line 59, please insert the word "of" between the words "function" and "that".

Signed and Sealed this

Thirty-first Day of August, 1993

*Attest:*

BRUCE LEHMAN

*Attesting Officer*            *Commissioner of Patents and Trademarks*